A. S. ROSS.
VEHICLE BRAKE MECHANISM.
APPLICATION FILED OCT. 20, 1908.
915,796.
Patented Mar. 23, 1909.
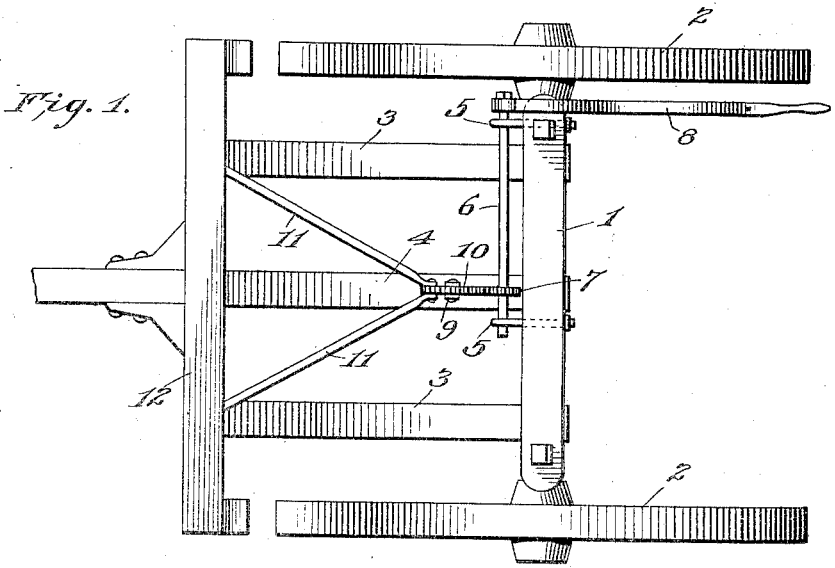
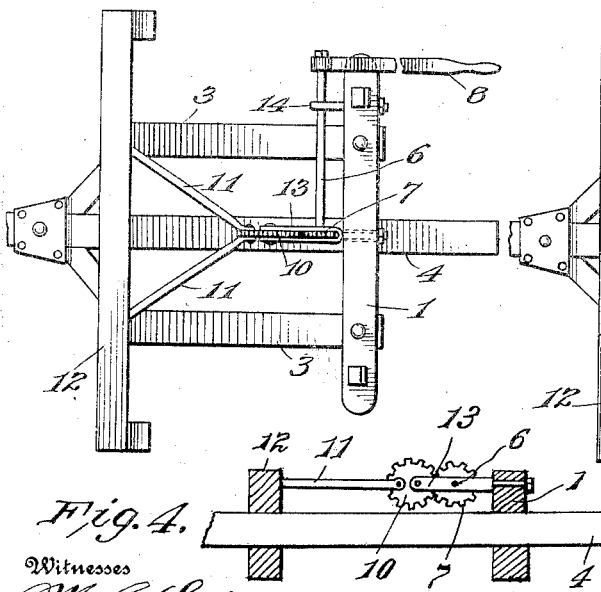
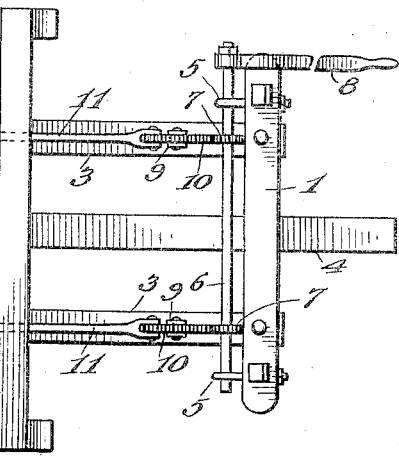
Inventor
Albert S. Ross
By Joshua R. H. Potts
Attorney
Witnesses

UNITED STATES PATENT OFFICE.

ALBERT S. ROSS, OF NORTH MEHOOPANY, PENNSYLVANIA.

VEHICLE-BRAKE MECHANISM.

No. 915,796.  Specification of Letters Patent.  Patented March 28, 1909.

Application filed October 20, 1908. Serial No. 458,599.

*To all whom it may concern:*

Be it known that I, ALBERT S. ROSS, a citizen of the United States, residing at North Mehoopany, in the county of Wyoming and State of Pennsylvania, have invented certain new and useful Improvements in Vehicle-Brake Mechanism, of which the following is a specification.

My invention relates to improvements in vehicle brake mechanism, the object of the invention being to provide improvements of this character, which will greatly increase the power of the brake by the use of a pinion and gear, or pinions and gear wheels, as the particular construction of vehicle may require, and which by the use of such mechanism great power may be put upon the brakes by the expenditure of but little power from the operator.

A further object is to provide improvements of this character comprising but few parts, easily assembled, strong and durable in use and not likely to be broken or get out of order and which can be very easily operated to most effectually brake the vehicle.

With these and other objects in view the invention consists in certain novel features of construction, combinations and arrangements of parts as will be more fully hereinafter described and pointed out in the claims.

In the accompanying drawings Figure 1, is a top plan view illustrating a preferred form of my improvements. Figs. 2 and 3 are views of modifications. Fig. 4, is a detail view in elevation illustrating the clevis and gears of Fig. 2.

1 represents a bolster supported by wheels 2 and carrying hounds 3, the latter and bolster constructed to receive reach 4. The reach 4 in Fig. 1 is secured against movement, and is what is known as a solid reach.

Eye-bolts 5 are secured in bolster 1 and have their eyes in alinement forming the bearings for a shaft 6 carrying a small pinion 7 just above the reach 4, and said shaft is provided at its outer end with an operating lever 8, preferably supported on the end of the bolster 1 as shown. A bracket 9 is secured on the reach 4 and carries a gear wheel 10 meshing with the pinion 7, of greater diameter than pinion 7 and rods or links 11 connect the brake-beam 12 with this gear wheel 10, so that when the gear wheel 10 is revolving the brake-beam will be moving toward or away from the wheels as the case may be.

In the modification shown in Fig. 2, my improvements are illustrated in connection with a vehicle having, what is known as a slip reach. In this modification a clevis 13 is secured to the bolster 1 at its center, and the pinion 7 and gear wheel 10 are both mounted in this clevis. The shaft 6 for turning the pinion 7 is supported at one end in the clevis 13, and its other end in an eye-bolt 14.

In the modification illustrated in Fig. 3, my improvements are also shown in connection with a slip reach, and in which I employ two pairs of pinions and gear wheels 7 and 10. I support the gear wheels 10 on the hounds 3, and connect each of said gear wheels with the brake beam 12 by means of links 11.

The operation of the several constructions described is as follows: When the brake lever 8 is raised, the pinion or pinions 9 on shaft 6 are revolved to transmit motion to the gear or gear wheels 10, and the latter acting as cams or eccentrics, will, through the medium of the rods connecting them with the brake-beam, draw the brake-beam toward the wheels and effectually apply the brake.

In all the constructions shown and described, it will be observed that great leverage is obtained to operate the brake, and the construction is cheap to manufacture and strong and durable in use.

Other changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

1. In a vehicle brake mechanism, the combination with a bolster and wheels supporting the same, of a central reach in said bolster, a brake-beam parallel with the bolster, and brake shoes on said beam, of a gear wheel, a connecting medium secured to the brake-beam and pivotally connected to opposite sides of the gear at points removed from the center of the latter, a pinion meshing with the gear wheel, a shaft on which said pinion is secured, said shaft supported on the bolster, and a rearwardly projecting crank-arm on said shaft.

2. In a vehicle brake mechanism, the combination of a bolster, wheels supporting the same, hounds secured to the bolster and a reach movable in said hounds and bolster, of a clevis secured to the center of the bolster, a large gear wheel mounted in said clevis, a brake-beam, rods connecting the beam with opposite sides of the said gear wheel, a shaft supported at one end in the clevis, a bearing secured to the bolster and supporting the shaft near its outer end, an operating crank arm on said shaft and a small pinion on said shaft in the clevis and meshing with the large gear wheel.

In testimony whereof I have signed my name to this specification in the presence of two subscribing witnesses.

ALBERT S. ROSS.

Witnesses:
   H. E. MAYNARD,
   ALVAH HURMAN.